UNITED STATES PATENT OFFICE.

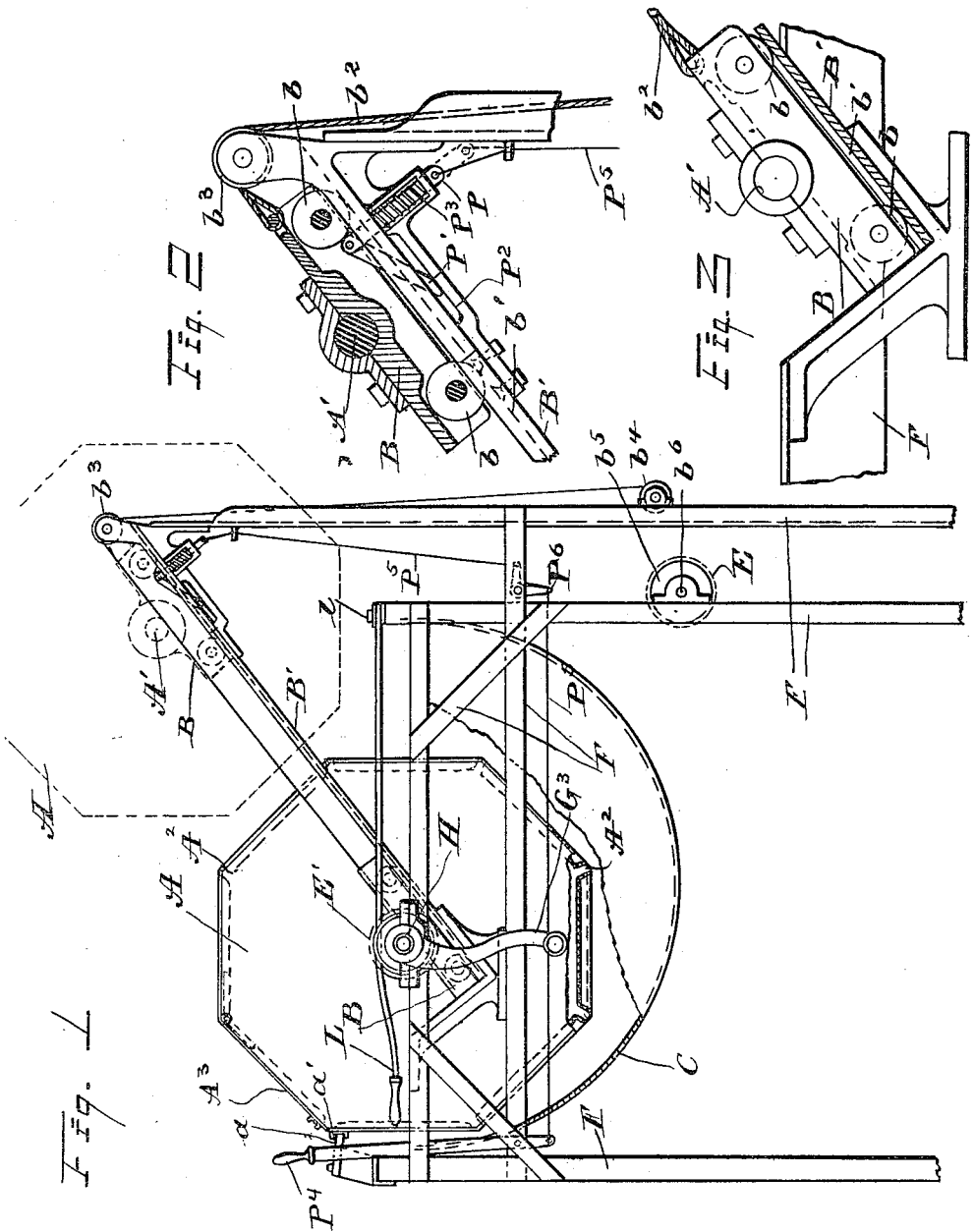

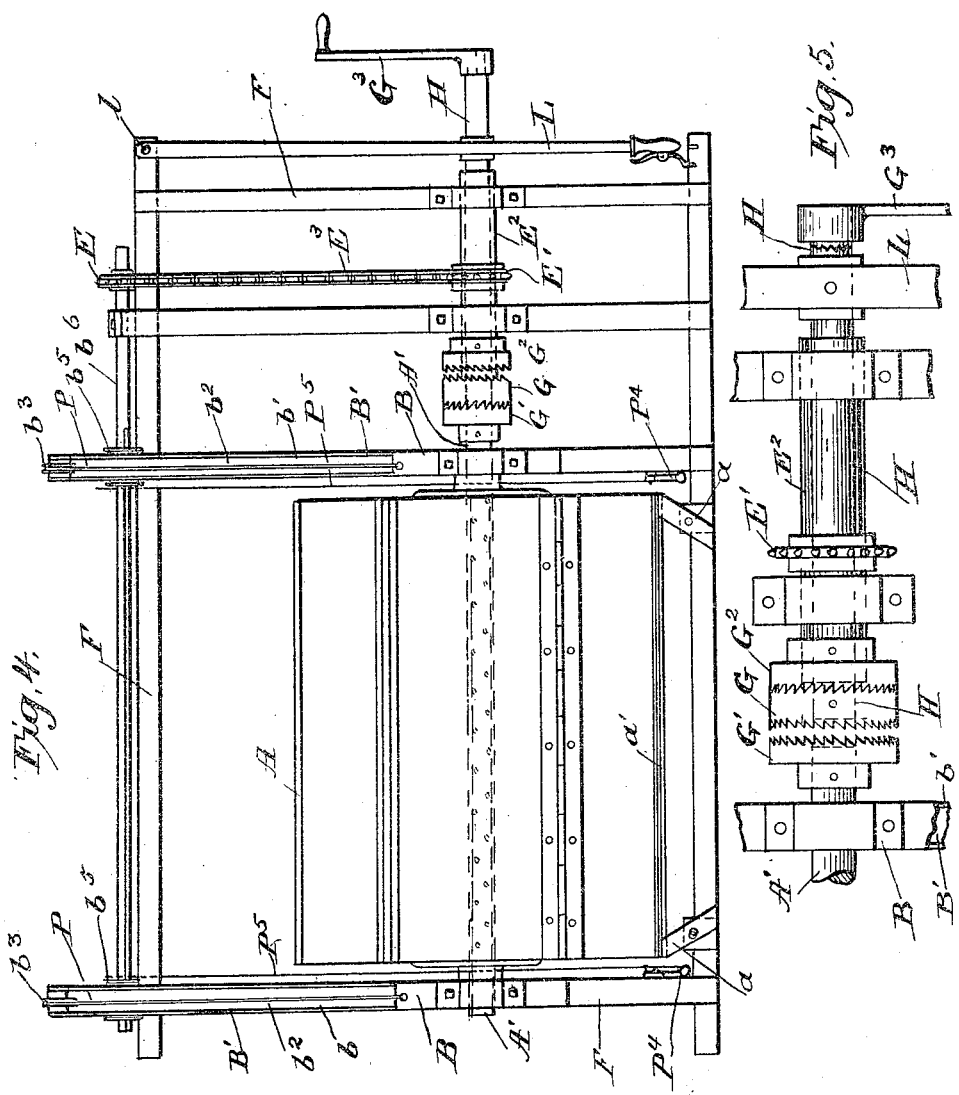

CHARLES A. SCHETTLER, OF CLEVELAND, OHIO.

VEGETABLE-WASHING MACHINE.

1,210,853.  Specification of Letters Patent.  Patented Jan. 2, 1917.

Application filed April 23, 1915. Serial No. 23,511.

*To all whom it may concern:*

Be it known that I, CHARLES A. SCHETTLER, a citizen of the United States, and resident of Cleveland, in the county of Cuyahoga and State of Ohio, have invented certain new and useful Improvements in Vegetable-Washing Machines, of which I hereby declare the following to be a full, clear, and exact description, such as will enable others skilled in the art to which it appertains to make and use the same.

The objects of the invention are to provide a machine for washing vegetables and particularly roots or tubers such as potatoes, beets, or carrots, which are often brought to market in large quantities with the earth in which they were grown clinging to them.

The device is adapted to cleanse large quantities of them at once and to reduce the cost attendant upon this operation to the minimum and prepare them for sale in the quickest possible manner.

The invention includes a rotatable drum in which the roots or vegetables are inclosed and which is immersed in a vat of water, which has access to all parts of the drum through openings formed in the wall thereof.

The invention further includes a removable cover for the drum, and means for revolving the drum and for holding it stationary while being loaded.

It further includes, inclined guides or runways and means for elevating the drum out of the vat of water, upon the runways to drain its contents and to permit the removal thereof.

It also includes a shaft on which the drum is mounted, a separate operating shaft, an elevating device for the drum and a clutch for alternately connecting the operating shaft with the drum shaft and with the drum elevating mechanism, and a device for rotating the operating shaft.

It also includes means for retaining the drum in its elevated position, and means for releasing the same to return by gravity under the control of the elevating device.

The invention further includes the combination and arrangement of parts and construction of the various details, hereinafter described, shown in the accompanying drawings and specifically pointed out in the claims.

In the accompanying drawings Figure 1 is a side elevation of the device; Fig. 2 is a transverse section of one of the movable bearings upon which the drum shaft is elevated to the higher position, it also shows the upper portion of one of the inclined guides or runways and the detachable retaining device for the bearing; Fig. 3 is a side elevation of the bearing showing it at the lower end of the runway and the runway; Fig. 4 is a plan view of the device; Fig. 5 is a plan view enlarged of the clutch mechanism, and the operating and drum shafts.

In these views A is the drum which contains the articles to be washed, it is mounted upon a central shaft $A'$ which revolves in movable bearings B, B, at each end of the drum.

The drum is preferably polygonal in shape and is provided with openings $A^2$, $A^2$ which can be conveniently formed at the angles of the drum and through these openings the water flows freely from a stationary vat C in which the drum is immersed. All sand or dirt will also flow out of these openings as fast as it is washed from the vegetables. As the drum is revolved in the water in the vat the contents will roll over and over and the vegetables knocking against one another will soon free each other from dirt, which is carried by the water out of the openings.

A slidable cover $A^3$ at one side of the drum permits the drum to be filled, and when in the filling position pivoted latches $a$, $a$, mounted upon the frame F are moved to engage channels $a'$, $a'$ upon the drum so as to retain the drum in its position, until filled.

The bearings B, B, upon which the drum shaft rests, are movable upon inclined runways $B'$, $B'$ or guides, upon the frame F, and upon which they togther with the drum are raised out of the water and elevated to a higher position to drain.

The bearings are provided with rollers $b$, $b$, which travel in grooves $b'$, $b'$ in the inclines $B'$ and are propelled by means of cords $b^2$, $b^2$, which run over guide pulleys $b^3$, $b^4$, and the spools $b^5$, $b^5$ upon a shaft $b^6$. This shaft is provided with a sprocket wheel E connected with a sprocket wheel $E'$ upon a sleeve $E^2$ which alternately with the drum shaft $A'$ is operatively connected with an operating shaft H by means of which the drum may selectively revolve on its bearings and within the vat or may with its bearings be elevated upon the runways B', B'. The means provided for alternately connecting these parts includes, a double clutch member G mounted upon the inner end of the operating shaft, which can be moved by moving said shaft longitudinally, either into engagement with a complementary clutch member G' upon the drum shaft or into engagement with a similar clutch member $G^2$ upon the sprocket bearing sleeve. A crank arm $G^3$ can be used to rotate the operating shaft, if it is desired to operate the machine by hand.

A lever L pivoted in the frame at $l$ is employed to reciprocate the operating shaft. After the bearings and drum have been raised to their most elevated position by means of the operating shaft, sleeve, sprocket chain and cords, spring actuated pins P, P, rise automatically behind the front rollers of the bearings and prevent their return, until the pins are depressed.

To enable the rollers to pass the pins, an incline is formed for each pin by means of an arm P' pivoted to the upper end of each pin P, and having its lower end slidingly engaged in a groove $P^2$ in the runway.

The front roller engages the arm P' and will depress the pin as it ascends the incline. As soon as it has passed by the pin, the spring $P^3$ will raise the pin P behind the roller and retain the bearing in position when it is desired to release the pins, a lever $P^4$ is pulled which is connected by means of the cords $P^5$ with each pin, and the pins are thereby withdrawn to permit the drum to descend to its original position.

Having described the invention what I claim as new and desire to secure by Letters Patent is:

1. In combination, in a vegetable washing machine, a water containing vat, a rotatable drum in which the articles to be washed are inclosed and immersed in said vat, said drum provided with openings for the circulation of water therethrough, bearings upon which said drum is rotatable, inclined guides upon which said bearings are movable, to raise said drum out of the water in said vat, means for rotating said drum and means for raising said bearings upon said guides to drain said drum and automatically acting locking devices for said bearings when raised upon said inclines, substantially as described.

2. In a washing machine, a vat, a frame supporting said vat, a drum rotatable in said vat and provided with openings for circulation of fluid, a shaft upon which said drum is rotatable, movable bearings for said shaft, an elevating device for said drum and bearings, an operating shaft, a clutch for alternately connecting the operating shaft with the drum shaft and with the drum elevating mechanism, and means for rotating the operating shaft.

3. The combination with a drum having an opening and a closure therefor, of a frame, inclined guides on the frame, a drum shaft, bearings therefor movable upon said guides, means for raising and lowering said drum and bearings upon said guides, depressible retaining means for said drum adapted to hold it in the elevated position, and means for releasing said retaining means.

4. In combination, a frame, a drum revoluble therein, a drum shaft, movable bearings therefor, an operating shaft, mechanism for elevating said bearings, and a clutch adapted to operatively connect the drum shaft with the operating shaft and alternately therewith to connect the elevating mechanism with the operating shaft.

5. The combination with a drum having an opening and a closure therefor, of a frame, inclined guides on said frame, a drum shaft, bearings therefor movable on said guide, said guides provided with shoulders limiting the downward passage of said bearings, means for raising and lowering said drum and bearings upon said guides, spring actuated holding members in the paths of said bearings and adapted to be depressed by said bearings in passing, and means for depressing said holding members to permit the return of said bearings.

In testimony whereof, I hereunto set my hand this 21st day of April, 1915.

CHARLES A. SCHETTLER.

In presence of—
RALPH W. JEREMIAH,
WM. M. MONROE.

Copies of this patent may be obtained for five cents each, by addressing the "Commissioner of Patents, Washington, D. C."